United States Patent [19]
Ikari

[11] Patent Number: 5,892,628
[45] Date of Patent: Apr. 6, 1999

[54] OPTICAL SYSTEM SUPPORTING DEVICE

[75] Inventor: Ichiro Ikari, Hachioji, Japan

[73] Assignee: Olympus Optical Co., Ltd., Japan

[21] Appl. No.: 947,230

[22] Filed: Oct. 8, 1997

[30] Foreign Application Priority Data

Oct. 11, 1996 [JP] Japan .................................. 8-270021

[51] Int. Cl.⁶ ...................................................... G02B 7/02
[52] U.S. Cl. ........................ 359/813; 359/823; 369/44.15; 369/247
[58] Field of Search .................................. 359/813, 814, 359/823, 824; 369/44.15, 44.16, 247

[56] References Cited

U.S. PATENT DOCUMENTS

| | | | |
|---|---|---|---|
| 5,467,328 | 11/1995 | Murakami et al. | 369/44.16 |
| 5,523,891 | 6/1996 | Fujisawa | 359/813 |
| 5,566,149 | 10/1996 | Song | 369/44.15 |
| 5,604,641 | 2/1997 | Matsui | 359/824 |
| 5,777,806 | 7/1998 | Ikegame et al. | 359/823 |

FOREIGN PATENT DOCUMENTS

6-197519  7/1994  Japan .

*Primary Examiner*—Loha Ben
*Attorney, Agent, or Firm*—Ostrolenk, Faber, Gerb & Soffen, LLP

[57] ABSTRACT

An optical system supporting device comprising:
  an objective lens,
  an objective lens holder holding the objective lens,
  a spring member having its one-side end secured to part of the objective lens holder, the spring member elastically supporting the objective lens holder, and
  a spring fixing member supporting the objective lens holder and the spring member, the other-side end of the spring member being secured to the spring fixing member,
  wherein the spring fixing member is composed of a synthetic resin exhibiting a ratio of coefficient of linear expansion along a flow direction to coefficient of linear expansion along a direction perpendicular to the flow direction of less than 1/2.5. A gate can be provided in a position such that in a plurality of spring fixing portions the synthetic resin has an orientation which is vertically and laterally symmetrical. Also, a gate can be provided in a position of the spring fixing member apart from the plurality of spring fixing portions with identical distances. This optical system supporting device can minimize the inclination of an objective lens attributed to a temperature change to thereby enable accurate recording of information on a high-density optical disc and reading of recorded information from the high-density optical disc.

17 Claims, 6 Drawing Sheets

Resin Orientation

Fig. 2

Resin Orientation

OPTICAL SYSTEM SUPPORTING DEVICE

BACKGROUND OF THE INVENTION

1. Field of the Invention

The present invention relates to an optical system supporting device. More particularly, the present invention is concerned with an optical system supporting device which can suitably be used as means for supporting an objective lens in an optical disc recording/reproducing apparatus.

2. Discussion of Related Art

Figure 3:
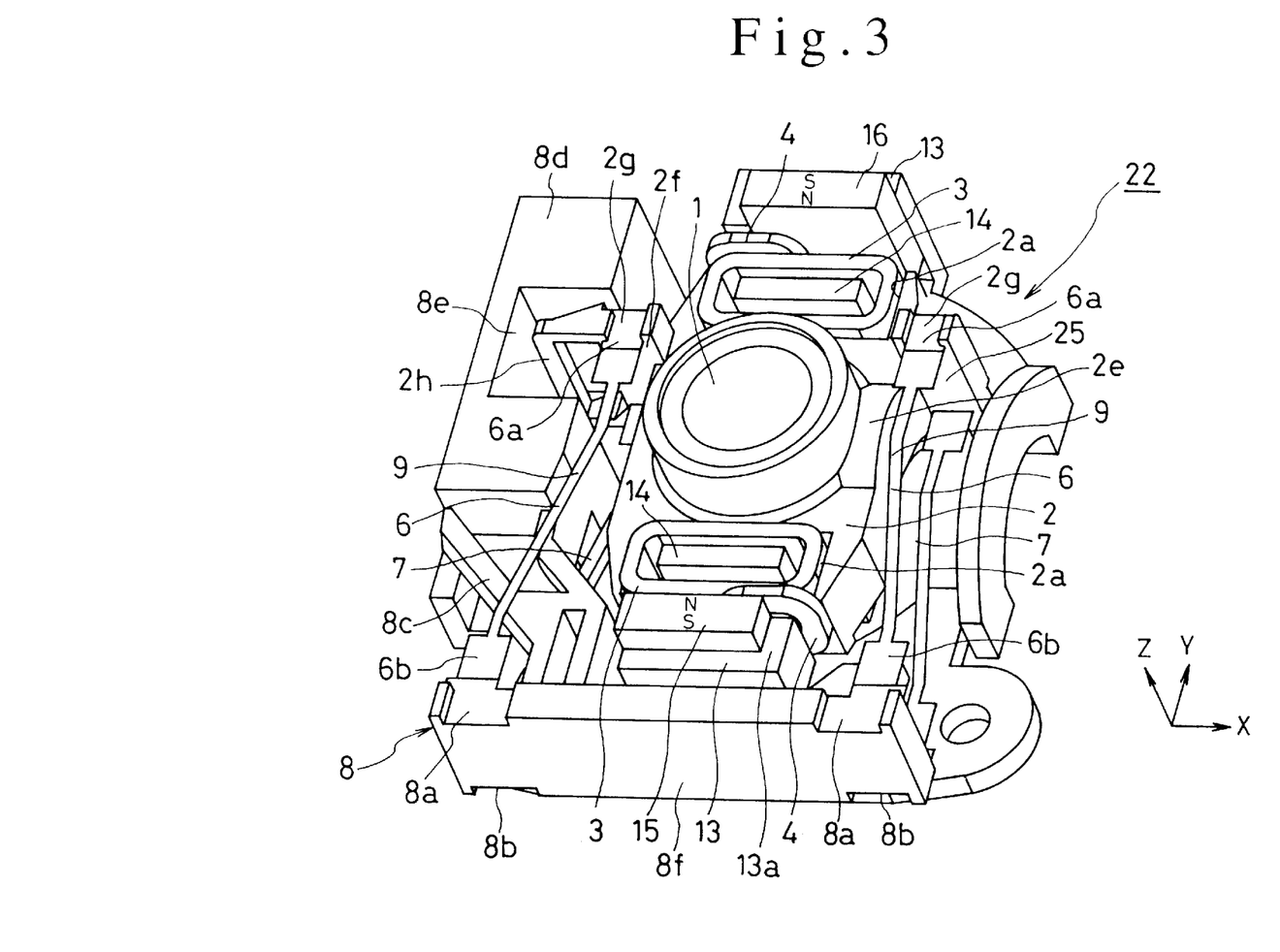
FIG. 3 is a perspective view of the entire construction of the conventional actuator.
Figure 4:
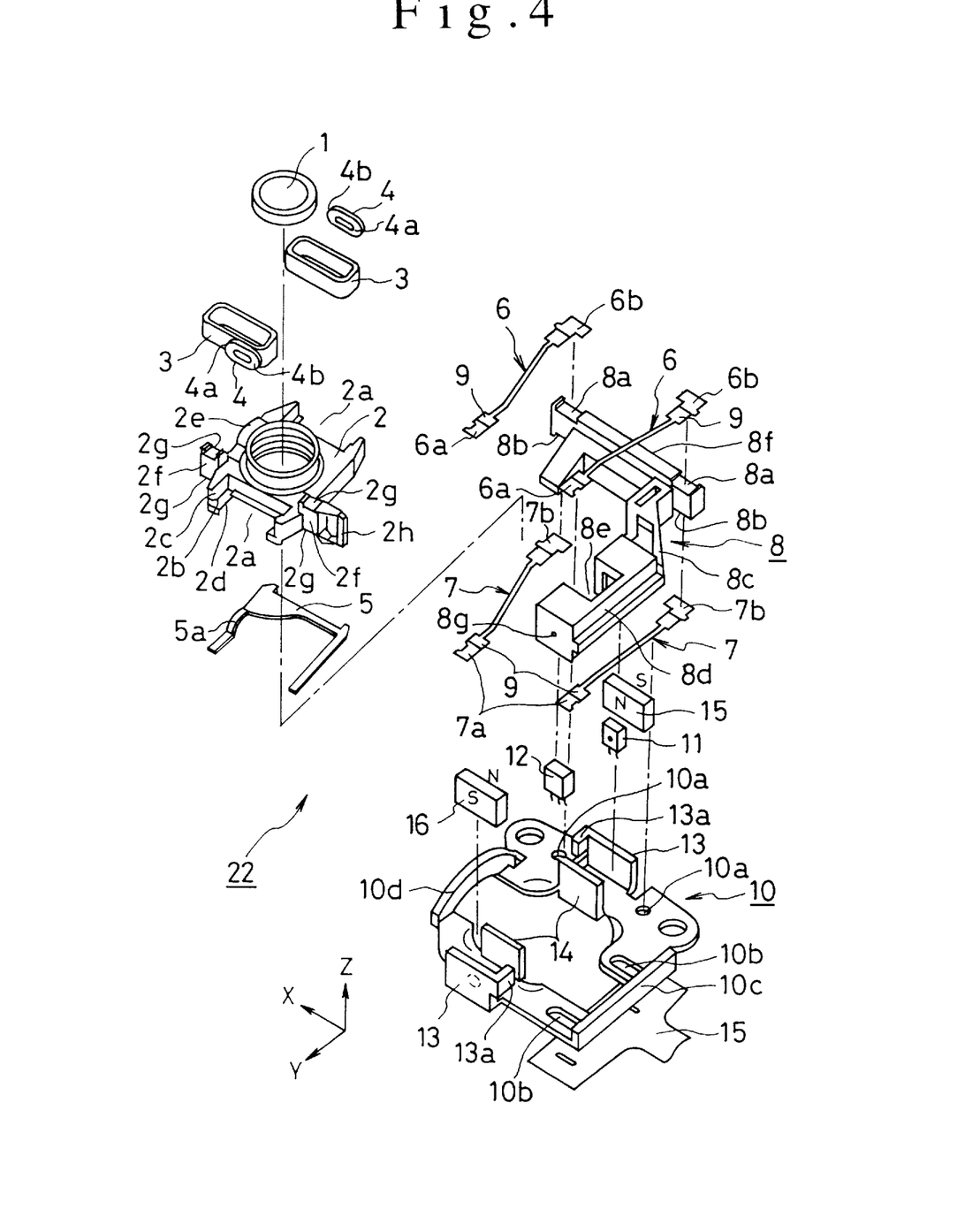
FIG. 4 is an exploded perspective view of the actuator of FIG. 3.
Figure 5:
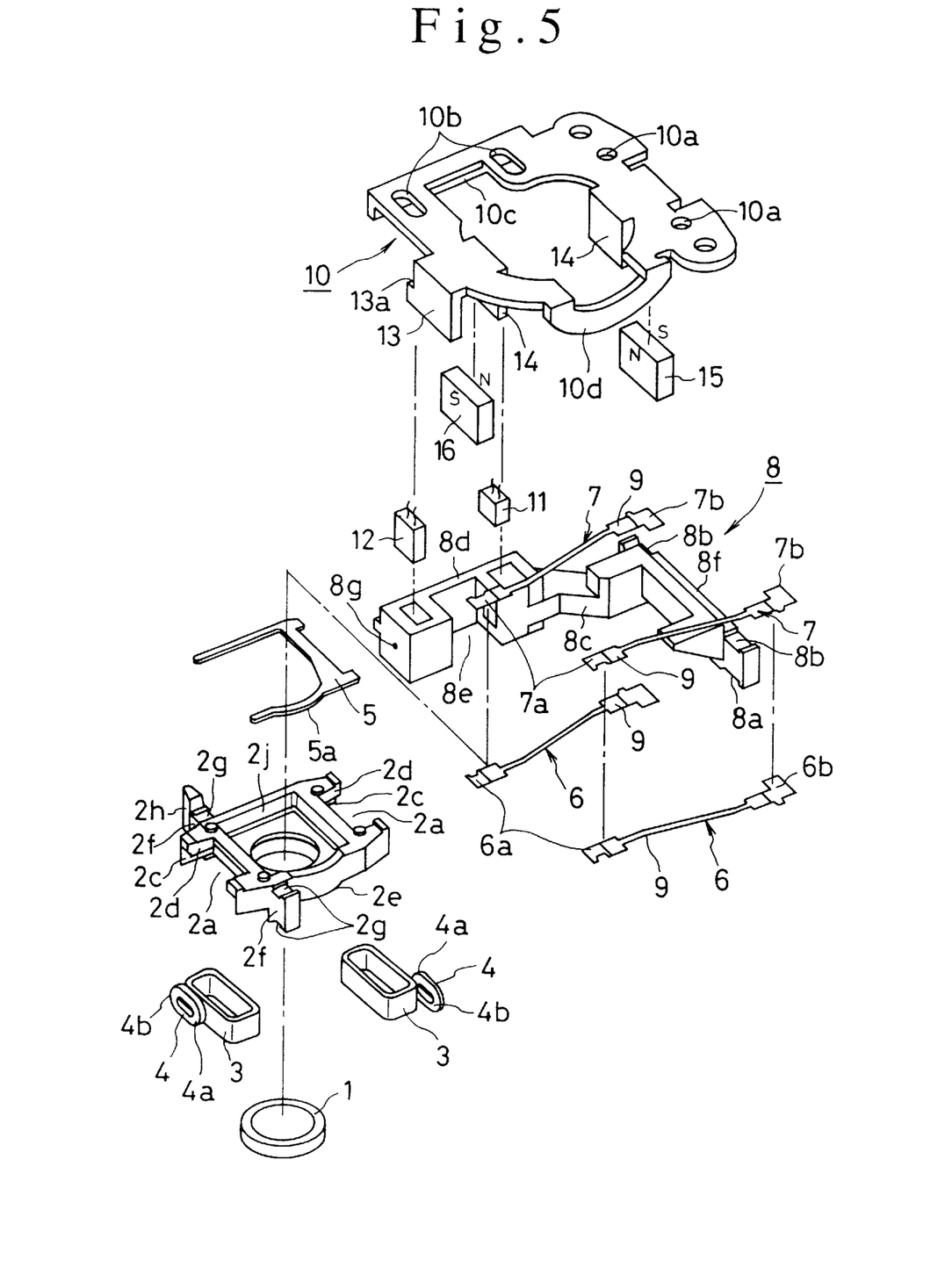
FIG. 5 is another exploded view corresponding to that of FIG. 4 viewed upside down in the Z-direction of FIG. 4.

An optical system supporting device for use in an optical disc recording/reproducing apparatus is, for example, disclosed in Japanese Patent Application Laid-open Specification No. 197519/1994. FIG. 3 as attached hereto is a perspective view showing the entire construction of an actuator employed therein, FIG. 4 is an exploded perspective view of the actuator, and FIG. 5 is another exploded view corresponding to that of FIG. 4 viewed upside down in the Z-direction of FIG. 4.

A lens holder 2 is fitted at its center with an objective lens 1. Both Y-direction ends of the lens holder 2 are provided with respective recesses 2a, 2a. Focus coils 3, 3 having a winding made in the form of a square pole are arranged in these recesses 2a, 2a. The recesses 2a, 2a comprise respective bottom faces 2b, side faces 2c and parts 2d protruding upward from both X-direction ends of the bottom face 2b. The focus coils 3, 3 have their bottom faces positioned and fastened by means of the bottom faces 2b of the recesses 2a, 2a, have their peripheral surfaces positioned and fastened by means of the side faces 2c of the recesses 2a, 2a and have their inside faces positioned and fastened by means of the protrudent parts 2d of the recesses 2a, 2a.

The focus coils 3, 3 are fitted at their remaining peripheral surfaces with tracking coils 4, 4. These tracking coils 4, 4 are arranged in positions oppositely deviated in the X-direction. The protrudent parts 2d are brought into abuttal with X-direction side faces of below described yokes 14 and thus act as X-direction stoppers for the lens holder 2.

The lens holder 2 is fitted at its bottom face with a balancer 5 formed so as to have a ⊐ shape along the periphery of the lens holder 2. This balancer 5 is made of a phosphor bronze plate. Referring to FIG. 5, a side of the lens holder 2 and a side of the balancer 5 are respectively provided with circular-arc-shaped protrudent parts 2e, 5a. Light beam emitted from a fixed optical system (not shown) passes just under this protrudent part 5a and falls incident upon a mirror (not shown). The balancer 5 is secured substantially along the periphery of the bottom face of the lens holder 2 to thereby increase the torsional rigidity around X-axis of the lens holder 2 and accordingly cause an increase of resonance frequency. Also, the protrudent part 2e formed in the lens holder 2 acts so as to increase the rigidity of the lens holder 2. A square recess part 2j for disposing a mirror is formed on the bottom side of the lens holder 2 so that the objective lens 1 is positioned in the vicinity of the mirror.

Both X-direction ends of the lens holder 2 are provided with protrudent parts 2f, 2f. Grooves 2g, 2g are formed on the upper and lower sides of the protrudent parts 2f, 2f. One-side ends 6a, 6a, 7a, 7a of springs 6, 6, 7, 7 are respectively secured to these grooves. Further, these spring ends 6a, 6a, 7a, 7a are directly soldered to terminals (not shown) of the focus coils 3 and the tracking coils 4. Other-side ends 6b, 6b, 7b, 7b of the springs 6, 6, 7, 7 are respectively secured with solder to grooves 8a, 8a, 8b, 8b provided at both X-direction ends of a spring fixing member 8. These grooves 8a, 8a, 8b, 8b of the spring fixing member 8 composed of a plastic and a spring fixing part 8f disposed on the back side of the spring fixing member 8 are provided with copper patterns to thereby enable electric connection to the springs 6, 6, 7, 7. Thus, FPC is not required therein, so that the problem can be obviated that the springs suffer from stresses due to, for example, a deformation of FPC. The springs 6, 6, 7, 7 are produced by etching a beryllium bronze plate and partially coated with dampers 9, 9, 9, 9. These springs 6, 6, 7, 7 holds the lens holder 2 in such a manner that the lens holder 2 can move in the X- and Z-directions. These springs 6, 6, 7, 7 are bent inward in the X-direction, and the spacings between bilaterally arranged springs 6, 7 are so set that the spacings between ends 6b, 6b and 7b, 7b on the side of the spring fixing member 8 are larger than the spacings between ends 6a, 6a and 7a, 7a on the side of the lens holder 2. This arrangement enables reducing the X-direction size on the side of the lens holder 2 and enables increasing the torsional rigidity around Y-axis.

Two bosses (not shown) are formed on the bottom face of the spring fixing member 8. The spring fixing member 8 is positioned on a base 10 by engaging the bosses with holes 10a, 10a made in the base. A housing 8d is integrated through a connecting part 8c with the spring fixing member 8. The housing 8d is provided at its one end with a resin injection gate 8g. The housing 8d is further provided with a recess 8e, in which a flag 2h disposed at one front end of the protrudent part 2f of the lens holder 2 is placed when the actuator 22 is assembled. LED 11 and PD 12 are fitted in the housing 8d. A light receiving face of the PD 12 are halved in the X-direction. Light emitted in the Y-direction from the LED 11 has its central zone shielded by the above flag 2h and falls incident upon the PD 12, so that the shadow of the flag 2h appears on a halving line of the PD 12. Therefore, the flag 2h, namely, information on the position of the objective lens 1 in the X-direction and information on the moving velocity thereof can be recognized by gaining an output difference of the light receiving face of the PD 12.

The connecting part 8c of the spring fixing member 8 is placed between the upper and lower springs 6, 7, so that the outline of the actuator 22 is not enlarged by the connecting part 8c.

The springs 6, 6, 7, 7 are assembled while the lens holder 2 and the spring fixing member 8 are positioned with the use of respective jigs. The flag 2h of the lens holder 2 is formed integrally with the lens holder 2 and the housing 8d is also formed integrally with the spring fixing member 8, so that the accuracy of mutual positional relationship of the LED 11, PD 12 and flag 2h is desirable and that an offset of differential output of the PD 12 is less probable. This construction renders unnecessary the position regulating workload at assembly. That is, it is intended to attain the reduction of part and assemble costs through the integration of a plurality of parts having been employed and through the avoidance of regulating work therefor. Moreover, the position sensing parts (flag 2h, LED 11, PD 12) for the objective lens 1 are placed opposite to the fixed optical system with respect to the mirror, so that the light beam between the mirror and the fixed optical system is not interfered with to thereby facilitate the arrangement of the position sensing parts.

The base 10 is formed by conducting a press molding of an iron plate. Four yokes 13, 13, 14, 14 extending in the X-direction are projecting in the Z-direction. Magnets 15, 16 magnetized in the direction of thickness are secured with the N poles inside to the inside faces of the outer yokes 13, 13. Magnetic gaps are formed between the magnets 15, 16 and the inner yokes 14, 14. Each of the outer yokes 13, 13 has its one X-direction end bent inward to thereby form a yoke 13a. Referring to FIG. 3, upon the assembly of the actuator 22, one side 4a, 4a of the tracking coil 4, 4 is placed opposite to the magnet 15, 16 and the other side 4b, 4b of the tracking coil 4, 4 is placed opposite to the yoke 13a, 13a. The direction of magnetic flux in the above magnetic gap at the one side 4a of the tracking coil 4 is opposite in the Y-direction to that at the other side 4b of the tracking coil 4, so that the directions of forces occurring at these sides 4a, 4b are the same in the X-direction. Further, one side of the focus coil 3 is also placed in this magnetic gap, so that a force occurs in the Z-direction.

FPC 15 is bonded to a lower face of the base 10 and soldered to LED 11 and PD 12 terminals passing through holes 10b, 10b made in the base 10 to thereby attain an electrical connection of these elements. One X-direction end of the base 10 is bent vertically upward to thereby form a reinforcing part 10c. The other X-direction end of the base 10 has its lower side cut off in the form of a circular arc to thereby form a light beam escape 10d. Light emitted from the fixed optical system passes just under this light beam escape 10d and falls incident upon the mirror.

Figure 6:
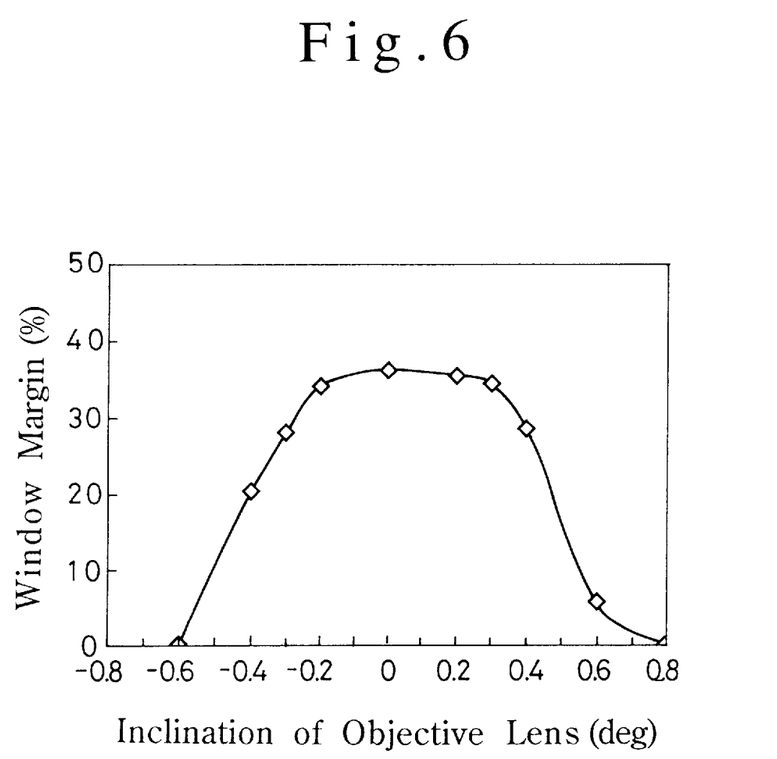
FIG. 6 is a view showing the relationship between the inclination of an objective lens and the window margin.

It is required that the above optical system supporting device be capable of accurately supporting the objective lens without causing the objective lens to shift from the appropriate location or suffer from an inclination even in an atmosphere of low temperature such as 0° C. to high temperature such as 60° C. Especially, in recent years, the optical disc is oriented toward a reduced track width and an increased data density for higher capacity, so that stricter restriction is posed on the shift and inclination of objective lens which invite a light spot aberration on a medium surface. For example, the influence of the inclination of the objective lens on the window margin is as shown in FIG. 6. The window margin is a property on which the recording and reproducing performance of the optical disc recording and reproducing apparatus can be evaluated. The window margin should be at least 30% for ensuring desirable recording and reproduction of information. When the inclination of the objective lens is nearly zero, the window margin is substantially constant. However, when the inclination of the objective lens exceeds about ±0.2° (±12'), the window margin sharply drops to thereby render the recording and reproduction of information difficult.

The spring fixing member 8 of the prior art has its parts integrated together for cost reduction so as to assume a laterally nonsymmetrical complex configuration of small size and small thickness and is obtained by injection molding. The plastic injected through the gate 8g disposed at one end of the housing 8d first fills the thin housing 8d and connecting part 8c and then flows therefrom so as to fill the spring fixing part 8f. Therefore, because the plastic flows thereinto from a position of about ¼ of the spring fixing part 8f, the plastic orientation (flow) is laterally nonsymmetrical with respect to the spring fixing part 8f. Moreover, because the plastic at the time of the above flow has a low temperature to thereby have a low fluidity, the plastic orientation is not smooth and an unbalanced stress remains in a solidified plastic.

Generally, the plastic is a high molecular polymer and has properties which are different according to the direction of alignment of the polymer molecule. The plastic exhibits the so termed anisotropy such that there is a difference between the coefficient of linear expansion along the direction of flow at the time of molding and the coefficient of linear expansion along the direction perpendicular to the above flow direction. The plastic for use in the optical system supporting device is compounded with 20 to 40% of a fibrous reinforcing material such as glass fiber for increasing the strength and rigidity thereof, and the direction of orientation of this compounded reinforcing material increases the anisotropy of the coefficient of linear expansion. Liquid crystal polymers (LCP) of desirable fluidity are generally used with an emphasis placed upon a small-thickness moldability as the plastic material of the spring fixing member 8. However, the liquid crystal polymers are materials of high anisotropy and, according to catalog data, the coefficient of linear expansion thereof is $0.7 \times 10^{-5}/°C$. along the flow direction and $4.4 \times 10^{-5}/°C$. along the direction perpendicular thereto. The ratio of these values is 1:6.28.

When the spring fixing member 8 formed from the material of nonsymmetrical plastic orientation having residual stress and high anisotropy encounters a temperature change, the spring fixing member 8 cannot uniformly expand and suffers from deformation such as warpage and torsion. In the actual measurement, it has been found that right and left faces of the groove 8a of the spring fixing member 8 incline as much as about 5' (0.083°) each in opposite directions by a temperature rise of 30° C.

Consequently, the four springs 6, 6, 7, 7 secured to the grooves 8a, 8b of the spring fixing member 8 move in directions which are different from each other. Further, even if the deformation of the employed spring fixing member 8 is slight, the front edge portions of the springs 6, 7 suffer from extended deformation. For example, providing that the grooves 8a, 8b of the spring fixing member 8 have their faces inclined as much as 5' (0.083°) and that each of the springs 6, 7 has a length of 10 mm, the deformation of the front edge portion of each spring is about 15 $\mu$m ($=10 \times 10^3$ sin 0.083°), which is as large as the sum of widths of at least 10 optical disc tracks. When the upper springs 6, 6 and the lower springs 7, 7 shift from each other in opposite directions as much as the above 15 $\mu$m, the lens holder 2, namely, the objective lens 1 is inclined as much as about 41' (0.69°)($=\sin^{-1}(2 \times 15/2.5 \times 10^3)$) because the upper and lower springs are spaced from each other as much as about 2.5 mm. This inclination means an 8-fold expansion of the deformation of the spring fixing member 8. An application of this inclination of the objective lens to the graph of FIG. 6 suggests that the window margin is nearly 0. Thus, it is apparent that the objective lens is of no practical use.

Therefore, the prior art has a drawback in that the objective lens 1 is so inclined that the laser spot focusing on an optical disc medium surface suffers from an aberration to thereby disenable accurate recording of information on the optical disc and reading of recorded information from the optical disc.

SUMMARY OF THE INVENTION

The present invention has been made with a view to resolving the above problem of the prior art, and an essential and principal object of the present invention is to provide an optical system supporting device which can minimize the inclination of an objective lens attributed to a temperature change to thereby enable accurate recording of information on a high-density optical disc and reading of recorded information from the high-density optical disc.

The foregoing and other objects, features and advantages of the present invention will become apparent from the following detailed description and appended claims taken in connection with the accompanying drawings.

BRIEF DESCRIPTION OF THE DRAWINGS

In the drawings:

FIG. 1 shows a spring fixing member of an optical system supporting device according to Embodiment 1 of the present invention, wherein

DETAILED DESCRIPTION OF THE INVENTION

For attaining the above objects, the optical system supporting device of the present invention has the following construction.

According to a first aspect of the present invention, there is provided an optical system supporting device comprising:
  an objective lens,
  an objective lens holder holding the objective lens,
  a spring member having its one-side end secured to part of the objective lens holder, the spring member elastically supporting the objective lens holder, and
  a spring fixing member supporting the objective lens holder and the spring member, the other-side end of the spring member being secured to the spring fixing member,
  wherein the spring fixing member is composed of a synthetic resin exhibiting a ratio of coefficient of linear expansion along a flow direction to coefficient of linear expansion along a direction perpendicular to the flow direction of less than 1/2.5.

According to a second aspect of the present invention, there is provided an optical system supporting device comprising:
  an objective lens,
  an objective lens holder holding the objective lens,
  a plurality of spring members having their one-side ends secured to parts of the objective lens holder, said spring members elastically supporting the objective lens holder, and
  a spring fixing member supporting the objective lens holder and the plurality of spring members, said spring fixing member having a plurality of spring fixing portions to which other-side ends of the plurality of spring members are secured,
  wherein the spring fixing member is composed of a synthetic resin exhibiting a ratio of coefficient of linear expansion along a flow direction to coefficient of linear expansion along a direction perpendicular to the flow direction of less than 1/2.5, and
  wherein a gate is provided in a position such that in the plurality of spring fixing portions the synthetic resin has an orientation which is vertically and laterally symmetrical.

In this construction, the synthetic resin extends radially around a center in the spring fixing part and the orientation of the synthetic resin is symmetrical laterally and vertically. This synthetic resin becomes confluent with a housing forming synthetic resin at a connecting part, so that not only does the amount of synthetic resin flowing in the spring fixing part become laterally uniform but also the cooling degree becomes identical. Therefore, the deformation of the spring fixing part can be minimized to thereby realize a vertical and lateral symmetry and reduce a residual stress.

According to a third aspect of the present invention, there is provided an optical system supporting device comprising:
  an objective lens,
  an objective lens holder holding the objective lens,
  a plurality of spring members having their one-side ends secured to parts of the objective lens holder, said spring members elastically supporting the objective lens holder, and
  a spring fixing member supporting the objective lens holder and the plurality of spring members, said spring fixing member having a plurality of spring fixing portions to which other-side ends of the plurality of spring members are secured,
  wherein the spring fixing member is composed of a synthetic resin exhibiting a ratio of coefficient of linear expansion along a flow direction to coefficient of linear expansion along a direction perpendicular to the flow direction of less than 1/2.5, and
  wherein a gate is provided in a position of the spring fixing member apart from the plurality of spring fixing portions with identical distances.

In these constructions, the synthetic resin fills the spring fixing part and flows into the housing, so that the synthetic resin orients along a lateral direction in the spring fixing part to thereby realize a vertical and lateral symmetry.

The first invention exerts the following function. That the major cause of the inclination of the objective lens of the optical system supporting device experienced in high temperature is the anisotropy of the coefficient of linear expansion of the plastic of the spring fixing member is apparent from a comparative study in which it has been shown that, when the spring fixing member is composed of a metal, no inclination results. A variety of plastic materials of various grades have been trialled and studied. As a result, it has been found that, when use is made of a material exhibiting a ratio of coefficient of linear expansion along a flow direction to coefficient of linear expansion along a direction perpendicular to the flow direction of less than 1/2.5, the inclination of the objective lens can be suppressed to fall within 10' (0.17°) ensuring serviceability in high-density optical discs. When the anisotropy of the coefficient of linear expansion is slight, the spring fixing member undergoes substantially uniform expansion and morphology change to thereby minimize unbalanced deformation such as warpage and torsion which would cause the inclination of the objective lens.

The second and third inventions exert the following function. When the plastic is injection molded, providing a gate in a position such that the orientation of the material flowing in the spring fixing part is vertically and laterally substantially symmetrical minimizes a residual stress and also minimizes the deformation of the spring fixing member to thereby realize a vertical and lateral symmetry with the result that the effect of the deformation of the spring member on the inclination of the lens holder is minimized to thereby enable more effectively suppressing the inclination of the objective lens.

The spring fixing member of the optical system supporting device of the present invention is preferably composed of an engineering plastic having high strength, rigidity and heat resistance. Examples of suitable engineering plastics include polycarbonates (PC), polyphenylene sulfide (PPS), liquid crystal polymers (LCP) and polyether imides (PEI) which are preferably blended with reinforcing materials such as glass fibers and other inorganic substances. When the spring member is to serve feeding electricity to an energizing coil, carbon fibers cannot be employed because these impart conductivity to the spring fixing member. However, when the construction is such that, for example, FPC is employed to thereby pass no electricity through the spring member, the above does not apply.

Effect of the Invention

As apparent from the foregoing, in the present invention, not only is the change of the spring fixing part of the employed spring fixing member experienced in high temperature vertically and laterally symmetrical and minimized but also the shift of the spring member becomes slight, so that the inclination of the objective lens upon change of the temperature is reduced so as to enable providing the optical system supporting device capable of accurate recording of information on a high-density optical disc and reading of recorded information from the high-density optical disc.

Preferred Embodiment of the Invention

The present invention will now be described in greater detail with reference to the following Embodiments, which should not be construed as limiting the scope of the invention.

The present invention is principally concerned with the material of the spring fixing member of the optical system supporting device, and other members of the optical system supporting device is the same as described in the prior art section. Therefore, in the following Embodiments, only the spring fixing member 8 will be described instead of describing the entire construction of the optical system supporting device.

Embodiment 1

Figure 1A:
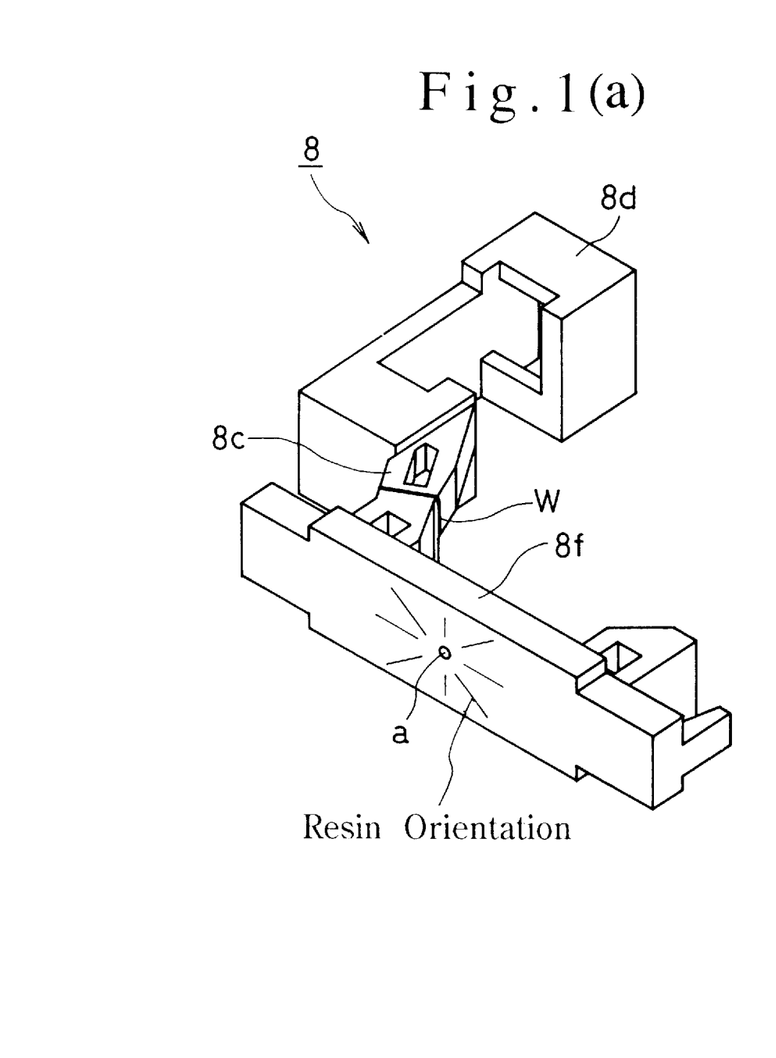
FIG. 1(a) is a perspective view thereof based on an observation from the side of a spring fixing part and FIG. 1(b) is a perspective view based on an observation from the side of a housing.
Figure 1B:
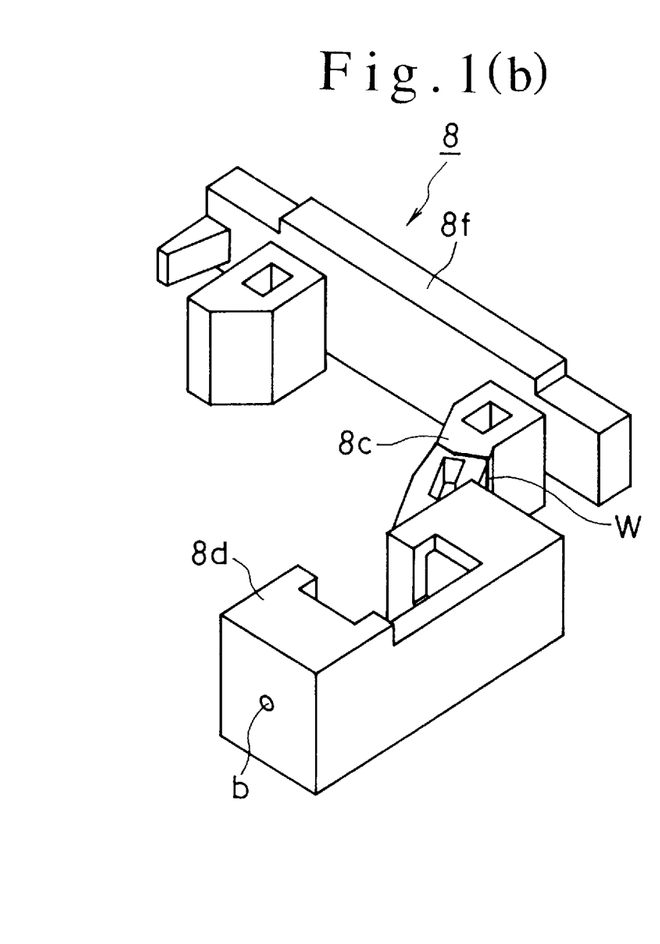

Embodiment 1 of the present invention will be described with reference to FIG. 1. FIG. 1 shows a spring fixing member of an optical system supporting device according to Embodiment 1 of the present invention, wherein FIG. 1(*a*) is a perspective view thereof based on an observation from the side of a spring fixing part and FIG. 1(*b*) is a perspective view based on an observation from the side of the housing.

The spring fixing member 8 according to Embodiment 1 of the present invention is composed of a liquid crystal polymer (LCP) of lowly anisotropic grade. An example thereof is Vectra A150B (trade name) produced by Polyplastics Co., Ltd. Vectra A150B is an insulating material filled with 50% by weight of glass fibers and inorganic substance. This liquid crystal polymer compound exhibits a linear expansion coefficient of $2.0 \times 10^{-5}/°C.$ along a flow direction and a linear expansion coefficient of $4.9 \times 10^{-5}/°C.$ along a direction perpendicular to the flow direction, the ratio thereof being as small as 1/2.45.

The spring fixing member 8 is provided with two gates, one disposed at portion (a) at a back center of the spring fixing part 8*f* and the other disposed at portion (b) of one end of the housing 8*d*. The plastic injected through the gate at portion (a) apart from four spring fixing portions of the spring fixing member with identical distances extends from the center toward the periphery in the spring fixing part 8*f*.

The plastic injected through the gate at portion (b) fills the housing 8*d*, reaches the connecting part 8*c* and becomes confluent with the plastic fed through the gate at portion (a). Although the confluent point of such two plastics is termed weld (W) and mechanical properties such as strength are generally deteriorated there, the deterioration of the properties of the spring fixing member 8 according to this Embodiment 1 is slight because the morphology thereof permits the plastics to become confluent in a large area while the temperatures of the plastics are held high. The spring fixing part 8*f* is filled at satisfactorily high temperature with the plastic whose orientation extends radially from the gate at portion (a) toward the periphery and is perfectly symmetrical both vertically and laterally. Moreover, the amount of plastic flowing in the spring fixing part 8*f* becomes laterally uniform by the influence of the plastic injection through the gate at portion (b) and the cooling degree thereof also becomes uniform, so that the residual stress is minimized. Therefore, even if the spring fixing member 8 is influenced by temperature, the spring fixing part 8*f* suffers from only a slight level of deformation which is substantially symmetrical both vertically and laterally. Therefore, the shift of the springs secured to the spring fixing part 8*f* is slight and symmetrical with the result that the inclination of the lens holder, namely, the objective lens can satisfactorily be suppressed.

If the gate at portion (b) of the housing 8*d* were absent, the plastic having filled the spring fixing part 8*f* would flow from the connecting part 8*c* into the housing 8*d*. Because the connecting part 8*c* locates on one side of the spring fixing part 8*f*, an unbalance would occur in the cooling degree of the plastic within the spring fixing part 8*f*, resulting in a residual stress. Therefore, the suppression of the inclination of the objective lens would be unsatisfactory.

Embodiment 2

Figure 2:
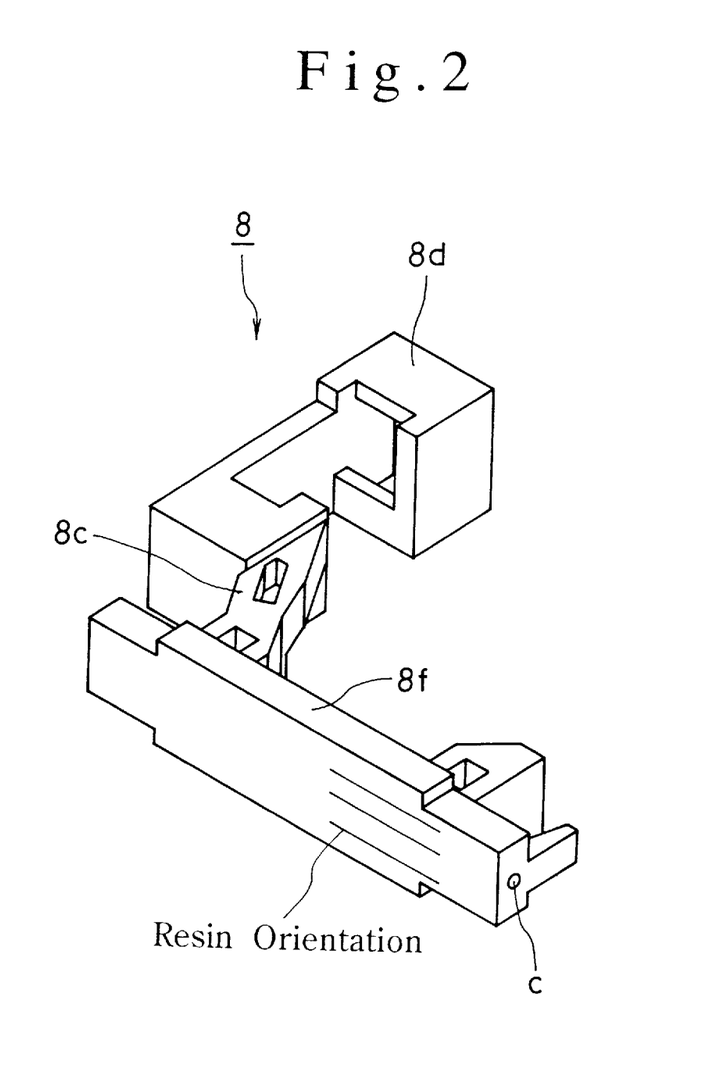
FIG. 2, is a perspective view of a spring fixing member according to Embodiment 2 of the present invention.

Embodiment 2 of the present invention will be described with reference to FIG. 2. FIG. 2 is a perspective view of a spring fixing member according to this Embodiment.

This spring fixing member 8 is composed of a polyphenylene sulfide (PPS) of isotropic grade. An example thereof is Sumikon MK115S (trade name) produced by Sumitomo Bakelite Co., Ltd. Sumikon MK115S is an insulating material filled with glass fibers and inorganic substance. This polyphenylene sulfide compound exhibits a linear expansion coefficient of $1.6 \times 10^{-5}/°C.$ along a flow direction and a linear expansion coefficient of $2.6 \times 10^{-5}/°C.$ along a direction perpendicular to the flow direction, the ratio thereof being as very small as 1/1.63.

The spring fixing member 8 is provided with a gate which is disposed at portion (c) at a side center of the spring fixing part 8*f*. The plastic injected through the gate at portion (c) fills the spring fixing part 8*f*, passes through the connecting part 8*c* and flows into the housing 8*d*. The orientation of the plastic in the spring fixing part 8*f* extends in a lateral direction and is symmetrical both vertically and laterally. The filling condition and cooling degree of the plastic are substantially uniform and no residual stress is present.

Therefore, even if the spring fixing member 8 is influenced by temperature, the spring fixing part 8*f* suffers from only a slight level of deformation which is substantially symmetrical both vertically and laterally. Therefore, the shift of the springs secured to the spring fixing part 8*f* is slight and symmetrical with the result that the inclination of the lens holder, namely, the objective lens can satisfactorily be suppressed.

Embodiment 3

Embodiment 3 of the present invention will be described below. The employed spring fixing member is composed of a polyether imide (PEI). An example thereof is Ultem 2300 (trade name) produced by Japan GE Plastics Co., Ltd. Ultem 2300 is an insulating material filled with 30% of glass fibers. This polyether imide compound exhibits a linear expansion coefficient of $1.3 \times 10^{-5}/°C.$ along a flow direction and a linear expansion coefficient of $3.1 \times 10^{-5}/°C.$ along a direction perpendicular to the flow direction, the ratio thereof being as small as 1/2.38. Other construction is the same as in Embodiments 1 and 2, so that relevant description and drawing are omitted.

The plastic for use in the present invention is not limited to the above plastics employed in the Embodiments as long as it is selected from among engineering plastics such as polycarbonates, nylons and polybutylene terephthalate which exhibit a ratio of coefficient of linear expansion along a flow direction to coefficient of linear expansion along a direction perpendicular to the flow direction of less than 1/2.5.

What is claimed is:

1. An optical system supporting device comprising:

an objective lens, an objective lens holder holding the objective lens, a spring member having its one-side end secured to part of the objective lens holder, said spring member elastically supporting the objective lens holder, and a spring fixing member supporting the objective lens holder and the spring member, the other-side end of said spring member being secured to the spring fixing member, wherein the spring fixing member is composed of a synthetic resin exhibiting a ratio of coefficient of linear expansion along a flow direction to coefficient of linear expansion along a direction perpendicular to the flow direction of less than 1/2.5.

2. The optical system supporting device according to claim 1, wherein the synthetic resin is a polycarbonate blended with a reinforcing material.

3. The optical system supporting device according to claim 1, wherein the synthetic resin is a polyphenylene sulfide blended with a reinforcing material.

4. The optical system supporting device according to claim 3, wherein the reinforcing material comprises glass fibers.

5. The optical system supporting device according to claim 3, wherein the reinforcing material comprises glass fibers and an inorganic substance.

6. The optical system supporting device according to claim 1, wherein the synthetic resin is a liquid crystal polymer blended with a reinforcing material.

7. The optical system supporting device according to claim 6, wherein the reinforcing material comprises glass fibers.

8. The optical system supporting device according to claim 6, wherein the reinforcing material comprises glass fibers and an inorganic substance.

9. The optical system supporting device according to claim 1, wherein the synthetic resin is a polyether imide blended with a reinforcing material.

10. The optical system supporting device according to claim 9, wherein the reinforcing material comprises glass fibers.

11. The optical system supporting device according to claim 1, wherein the synthetic resin comprises nylon.

12. The optical system supporting device according to claim 1, wherein the synthetic resin comprises polybutylene terephthalate.

13. An optical system supporting device comprising:

an objective lens, an objective lens holder holding the objective lens, a plurality of spring members having their one-side ends secured to parts of the objective lens holder, said spring members elastically supporting the objective lens holder, and a spring fixing member supporting the objective lens holder and the plurality of spring members, said spring fixing member having a plurality of spring fixing portions to which other-side ends of the plurality of spring members are secured, wherein the spring fixing member is composed of a synthetic resin exhibiting a ratio of coefficient of linear expansion along a flow direction to coefficient of linear expansion along a direction perpendicular to the flow direction of less than 1/2.5, and wherein a gate is provided in a position such that in the plurality of spring fixing portions the synthetic resin has an orientation which is vertically and laterally symmetrical.

14. The optical system supporting device according to claim 13, wherein the gate is provided in a back center of the spring fixing member.

15. The optical system supporting device according to claim 13, wherein the gate is provided in a side center of the spring fixing member.

16. An optical system supporting device comprising:

an objective lens, an objective lens holder holding the objective lens, a plurality of spring members having their one-side ends secured to parts of the objective lens holder, said spring members elastically supporting the objective lens holder, and a spring fixing member supporting the objective lens holder and the plurality of spring members, said spring fixing member having a plurality of spring fixing portions to which other-side ends of the plurality of spring members are secured, wherein the spring fixing member is composed of a synthetic resin exhibiting a ratio of coefficient of linear expansion along a flow direction to coefficient of linear expansion along a direction perpendicular to the flow direction of less than 1/2.5, and wherein a gate is provided in a position of the spring fixing member apart from the plurality of spring fixing portions with identical distances.

17. The optical system supporting device according to claim 16, wherein the gate is provided in a back center of the spring fixing member.

* * * * *